April 15, 1969     R. MIRACLE ET AL     3,439,111
SHIELDED CABLE FOR HIGH FREQUENCY USE
Filed Jan. 5, 1966
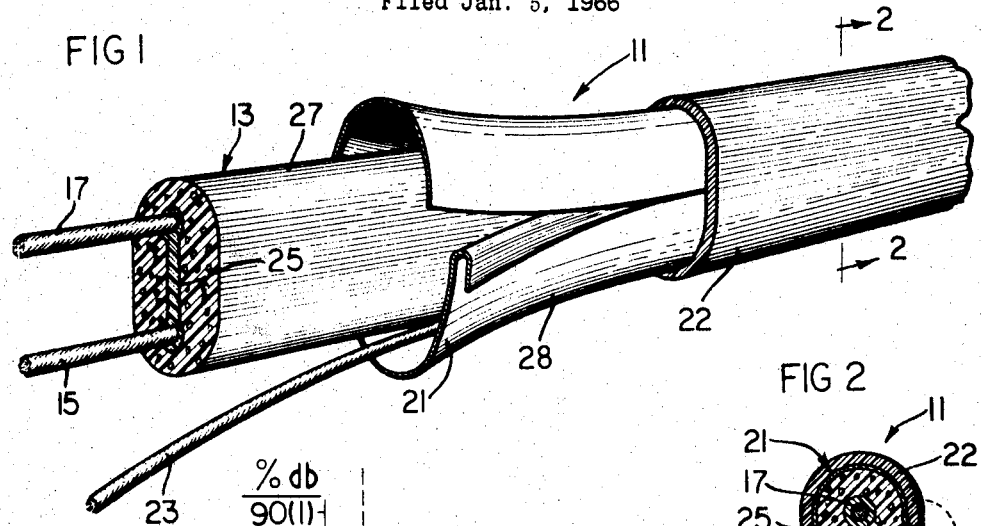
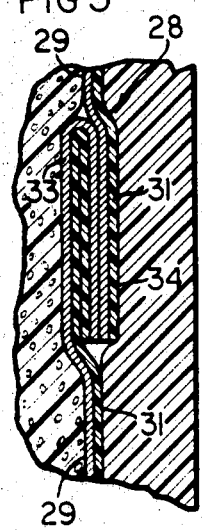
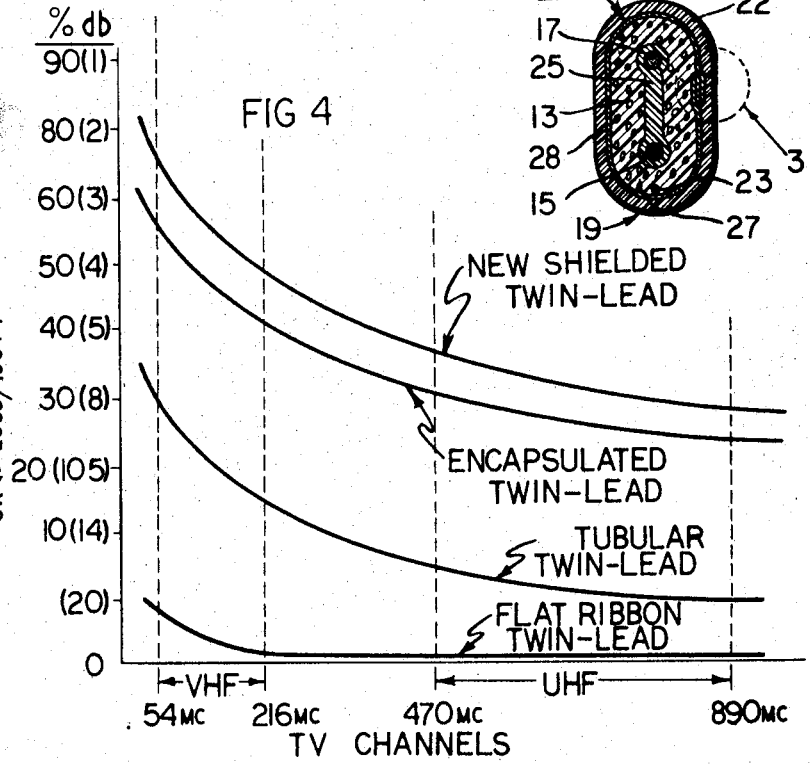
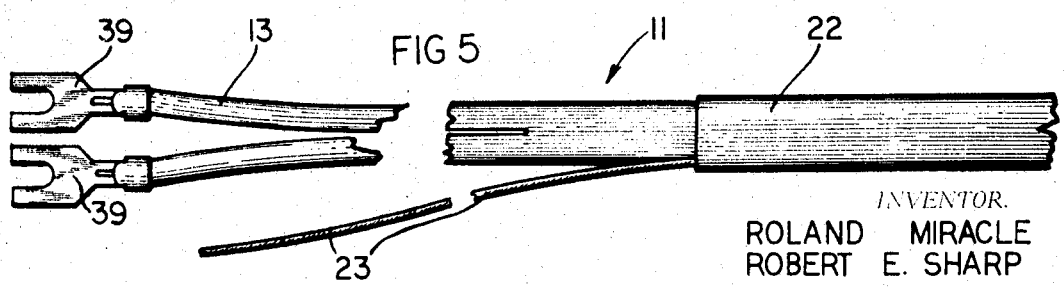
INVENTOR.
ROLAND MIRACLE
ROBERT E. SHARP
BY Anderson, Luedeka, Fitch, Even, & Tabin
ATTORNEYS

United States Patent Office 3,439,111
Patented Apr. 15, 1969

3,439,111
SHIELDED CABLE FOR HIGH FREQUENCY USE
Roland Miracle and Robert E. Sharp, Richmond, Ind., assignors to Belden Manufacturing Company, Chicago, Ill., a corporation of Illinois
Filed Jan. 5, 1966, Ser. No. 518,859
Int. Cl. H01b 7/18, 11/06
U.S. Cl. 174—107                                    7 Claims

ABSTRACT OF THE DISCLOSURE

A high frequency cable is provided having a pair of parallel spaced conductors embedded within a core of insulating material which maintains the conductors in uniformly spaced fixed planar relation to each other throughout the length of the cable. The core includes a sheath of multi-cellular, low density insulating material, and a shield envelopes the sheath. The shield comprises an enlongated strip of conductive foil which is wrapped about the sheath with the marginal edges generally parallel to the axis of the cable. A further insulating material surrounds the shield and provides a weather tight insulation thereabout.

---

This invention generally relates to electrical cables and, more particularly, this invention relates to shielded electrical cables adapted for the transmission of television signals which generally lie within the frequency spectrum between 54 and 890 megacycles. Heretofore, the generally accepted manner of coupling a television antenna to the terminals of a television receiver has been by means of a conventional 300 ohm duplex or twin-lead cable. Such twin-lead cables generally consist of two parallel conductors spatially positioned and imbedded within a monolithic generally flat body of polyethylene insulation. In use, certain precautionary practices are generally followed to minimize loss and distortion of the signal carried by the cable.

To conform to accepted practices for the reduction of extraneous signal pickup, such twin-lead cables are twisted so that extraneous signals induced into the cable will be self-cancelling. To prevent the creation of impedance nodes within the cable and thereby minimize signal distortion and loss, such cables when routed around surrounding objects such as flashings, gutters or other structures are maintained spaced therefrom by specially designed stand-off insulators. A further disadvantage in the use of such cables is that they are affected by moisture, dirt and other environmental conditions which adversely affect the transmission characteristics of the cable. Such an attenuation increase is particularly noticeable in industrial area installations. The use of such cables, with their inherent disadvantages, is particularly unsatisfactory for the reception of complex color television signals.

In an effort to avoid the aforementioned disadvantages of conventional twin-lead television transmission cables, coaxial cables have frequently been employed. While the installation of such cables does not require twisting nor particular routing methods, certain other disadvantages are experienced in the use of such cables. For example, the nominal impedance which a coaxial cable will afford to the antenna and the receiver terminals is unsatisfactory if maximum power transfer is to be obtained. The nominal impedance of coaxial cables generally ranges between 50 and 125 ohms while accepted practice is to provide receiver input and antenna impedance in the vicinity of 300 ohms. To overcome this difficulty, while still maintaining the routing flexibility obtained through the use of coaxial cables, impedance matching transformers are usually used to match the input impedance of the receiver and the antenna to that of the cable. However, a pair of such transformers generally introduces an additional loss of 2 db into the system. Further, in the UHF ranges the attenuation of the signal by generally available coaxial cable is excessively high.

An object of this invention is to provide an improved shielded electrical cable for the transmission of television signals. A more particular object of this invention is to provide a shielded electrical cable having a relatively constant attenuation over the television frequency range regardless of environment. A still further object is the provision of a shielded television transmission cable having means for grounding the shield thereof.

Other objects and advantages of the invention will become apparent through reference to the following description and accompanying drawing which shows an illustrative embodiment of this invention, in which:

FIGURE 1 is a perspective view of one embodiment of a cable in accordance with the present invention having a portion thereof partially removed to better illustrate the constructional features thereof;

FIGURE 2 is a sectional view taken along the line 2—2 of FIGURE 1;

FIGURE 3 is an enlarged fragmentary view of the section of the cable within the area 3 of FIGURE 2;

FIGURE 4 is a graphical representation of the transmission characteristics of a cable constructed in accordance with the embodiment illustrated in FIGURE 1 and installed in a hostile environment as compared to other generally used television transmission cables installed in a hostile environment; and FIGURE 5 is a reduced plan view of the cable illustrated in FIGURE 1 fabricated for connection.

Briefly, the cable 11 illustrated comprises a central core 13 having two parallel spaced conductors 15 and 17 imbedded within a flexible insulation. A shield 21 of electrically conductive material surrounds the central core 13 and a jacket 22 encloses the shield. The shield 21 serves to minimize the coupling of extraneous signals into the cable 11. To facilitate electrical connection to the shield, a drain wire 23 is provided which is maintained in surface contact with the shield 21.

More particularly, the illustrated embodiment comprises the central core 13 which includes the pair of spaced conductors 15 and 17. The conductors are preferably of stranded, copper-covered steel wire and are parallel oriented and spatially positioned approximately $15/64$ of an inch apart. The spaced conductors are imbedded within a web 25 of solid polyethylene displaying a dumbbell shape in cross-section. The web 25 serves to maintain the conductors in their desired spatial relation during the application of an outer cellular polyethylene sheath 27. The sheath 27 is constructed of polyethylene having a large portion of its volume consisting of gas-filled spaces so that the bulk density is at least 40% less than the solid polyethylene insulation forming the web. The polyethylene sheath 27 is multi-cellular having an interior section which consists of a series of individually sealed, unconnected cells containing air or gas thereby forming a moisture proof dielectric. The polyethylene sheath material is similar to that described in Patent No. 2,782,251 issued to Lawrence C. Ebel on Feb. 19, 1957, and entitled, "Cable for High Frequency Use."

Surrounding the central core 13 of the cable 11 is the shield 21 which serves to minimize the coupling of extraneous signals into the conductors 15 and 17. Because of its strength and flex life the shield 21 is preferably in the form of a strip 28 of flexible foil formed by laminating a thin film of aluminum 29 to oneside of an insulation tape 31 such as polyethylene terephthalate resin sold under the trade name "Mylar." It has been found that a layer of aluminum having a thickness of at least .0003 inches provides a cable having minimum attenuation characteristics. The insulated foil is cut into an elongated strip and positioned about the central core 13 of the cable 11 with the longitudinal axis of the strip generally parallel to the axis of the conductors 15 and 17 and the metallic side thereof in intimate contact with the core 13. As illustrated in FIGURE 3, a marginal edge 33 of the strip 28 is folded back upon itself outwardly exposing a metallic surface thereof so as to provide electrical contact with the remaining edge 34. Thus, when the insulated foil is wrapped about the core, a continuous shield is provided in the form of a tube about the entire cable thereby providing a complete shield about the conductors 15 and 17. Alternatively, the strip may be positioned about the core 13 with the metallic side thereof outwardly disposed and the drain wire sandwiched between the strip and the outer jacket 22.

It should be understood that while preferably the shield 21 of the illustrated embodiment is in the form of a strip of insulated metallic foil, in certain applications, the shield may be constructed of any suitable flexible conductive material. It has been found that the previously described lateral application of the shield 21 to the core 13 provides a cable having lower signal attenuation in the UHF spectrum as compared to a spirally wrapped shield of similar material.

As previously mentioned, the drain wire 23 is preferably sandwiched between the central core 13 and the metallic surface 29 of the shield 21 and passed along the cable substantially parallel to the conductors 15 and 17. Under certain conditions the use of a drain wire may be unnecessary; the shield alone serving to prevent the coupling of extraneous signals into the conductors 15 and 17. Therefore, certain embodiments of this invention may eliminate the drain wire 23. To provide a weather-tight seal about the cable and to protect the shield 21 from abrasion, the outer jacket 22 of solid non-porous polyethylene insulation is formed thereabout. The sandwich construction of the cable, in the form of a tightly fitting shield and outer jacket, provides a water-tight cable construction which greatly stabilizes the attenuation characteristic of the cable in normal outdoor applications and further permits the cable to be routed under water or within the ground.

The graph displayed in FIGURE 4 illustrates the improved transmission characteristics of a cable constructed in accordance with the preceding description as compared to other generally used television transmission cables when installed in a hostile environment. The chart illustrates the performance of various television lead-ins with costs of lossy surface deposits as may arise in hostile environments. As illustrated, signal attenuation by the cable throughout the UHF television spectrum is substantially lower than for the other leads shown.

The transmission characteristics resulting from the moisture-proof, sandwich-type construction of the cable are relatively constant, both under laboratory tests and in installation under difficult environmental conditions. Further, the shielded cable of the illustrated embodiment maintains a far lower value of attenuation than a cable of similar core construction when lossy surface deposits are present, such as a semiconductor coating acquired by weathering in an industrial area.

FIGURE 5 illustrates the cable 11 fabricated for connection. The cable 11 is fabricated by removing a portion of the jacket 22 and shield 21 to expose the central core 13 and the drain wire 23. A portion of the sheath 27 is removed to expose the ends of the conductors 15 and 17 and the central core 13 is separated between the conductors as illustrated. To facilitate connection to the television set, terminal lugs 39 may be secured to the drain wire 23 and to each of the conductors 15 and 17. If desired, the lugs may be omitted and the conductors 15 and 17 wrapped around the terminal screws of the receiver. It should be noted that the drain wire of the illustrated embodiment greatly facilitates electrical connection to the shield 21 of the cable.

The antenna end of the cable may be prepared in a similar manner; however, the drain wire is normally not used at the antenna. A sleeve of shrinkable tubing may be positioned over the cable at the antenna end and heat applied thereto so that the sleeve will shrink about the cable to provide a weather-tight seal to prevent moisture from entering the end of the cable.

Thus, in accordance with the illustrated embodiment an improved television transmission cable has been provided which will provide improved attenuation characteristics when subjected to adverse environmental conditions. Further, such cable may be routed underground, through metallic conduits and under water without materially affecting the transmission characteristics thereof. The illustrated cable further provides an improved means of connecting the shield thereof to a ground potential.

Although but one specific embodiment of this invention has been hereinafter shown and described, it will be understood that details of the construction shown may be altered without departing from the spirit of this invention, as defined by the following claims:

1. A shielded cable suited for the transmission of high frequency electrical energy comprising a substantially flat web of solid polyethylene insulation, a pair of parallel spaced conductors imbedded within said web, said web maintaining said conductors in uniformly spaced fixed planar relation, a sheath of multi-cellular low density polyethylene impervious to fluids and compatible with said solid polyethylene web providing an enveloping covering about said web, said web being bonded directly to said sheath preventing the longitudinal flow of gas or vapor through the interior of said cable, a shield surrounding said sheath, said shield comprising an elongated flat strip of metallic foil having a film of insulating material upon one side thereof wrapped about said sheath, one of the marginal edges of said strip being folded back so that the metallic surface thereof is positioned in surface contact with the metallic surface along the remaining marginal edge of said strip, said strip being positioned with the marginal edges thereof generally parallel to the axis of said cable, a third metallic conductor positioned along the metallic surface of said strip facilitating electrical connection thereto, and a covering of insulating material surrounding said shield providing a weather-tight insulation thereabout.

2. A shielded cable suited for the transmission of high frequency electrical energy comprising a substantially flat web of solid polyethylene insulation, a pair of parallel spaced conductors imbedded within said web, said web maintaining said conductors in uniformly spaced fixed planar relation, a sheath of multi-cellular low density polyethylene impervious to fluids and compatible with said solid polyethylene web providing an enveloping covering about said web, said web being bonded directly to said sheath preventing the longitudinal flow of gas or vapor through the interior of said cable, a shield surrounding said sheath, said shield comprising an elongated flat strip of metallic foil having a film of insulating material upon one side thereof and a coating of aluminum having a minimum thickness of .0003 inch upon the remaining side thereof, said shield being wrapped about said sheath with the metallic surface thereof inwardly positioned in surface contact with said sheath, one of the marginal edges of said strip being folded back, outwardly exposing the metallic surface thereof, and being in surface contact with the metallic surface along the remaining marginal edge of the said foil strip, said shield being positioned with the marginal edges thereof generally parallel to the axis of said cable, a third metallic conductor sandwiched between said shield and said sheath and in surface contact with the metallic surface of said shield facilitating electrical connection thereto, and a covering of insulating material surrounding said shield providing a weather-tight insulation thereabout.

3. A shielded cable suited for the transmission of high frequency electrical energy comprising a substantially flat web of solid insulating material, a pair of parallel spaced conductors embedded within said web, said web maintaining said conductors in uniformly spaced fixed planar relation to each other throughout the length of said cable, a sheath of multi-cellular, low density insulating material impervious to fluids and compatible with said solid insulating material providing an enveloping coating for said web, said web being bonded directly to said sheath and preventing the longitudinal flow of gas or vapor through the interior of said cable, a shield of electrically conductive material enveloping said sheath and minimizing the coupling of extraneous voltages into said pair of parallel spaced conductors, said shield being in the form of an elongated flat strip of metallic foil having a film of insulating material upon one side thereof, one of the marginal edges of said strip being folded back so that the metallic surface thereof is positioned in contact with the metallic surface along the remaining marginal edge of the strip, said strip being positioned with the marginal edges thereof generally parallel to the axis of the sheath, and a covering of insulating material surrounding said shield, providing a weather-tight insulation thereabout.

4. A shielded cable suited for the transmission of high frequency electrical energy comprising a substantially flat web of insulating material, a pair of parallel spaced conductors embedded within said web, said web maintaining said conductors in uniformly spaced fixed planar relation to each other throughout the length of said cable, a sheath of multi-cellular, low density insulating material disposed about said web and forming a barrier therewith impervious to the flow of gas or vapor through the interior of said cable, a shield enveloping said sheath, said shield comprising an elongated strip of conductive foil having a pair of marginal edges and being wrapped about said sheath with said marginal edges in conductive contacting relation and generally parallel to the axis of the cable, and a further insulating material surrounding said shield and providing a weather-tight insulation thereabout.

5. A television lead-in transmission line comprising a substantially flat web of solid insulating material, a pair of parallel spaced conductors embedded within said web, said web maintaining said conductors in uniformly spaced fixed planar relation to each other throughout the length of said line, a sheath of multi-cellular low density insulating material disposed about said web, a shield enveloping said sheath and comprising an elongated metal strip having a pair of marginal edges and a layer of insulating material upon one side thereof, said shield being positioned with the marginal edges thereof in generally overlapping relation and generally parallel to the axis of the line, the metal of said shield having a minimum thickness of .0003 inch and a maximum thickness sufficiently small so as to maintain shield flexibility, and a covering of insulating material surrounding said shield, providing a weather-tight insulation thereabout, the cross-section of said transmission line being elongated in said plane of the parallel conductors.

6. A television lead-in transmission line in accordance with claim 5 comprising a further conductor adjacent the metal surface of said shield and in electrical contact therewith.

7. The television lead-in transmission line in accordance with claim 5 comprising a further conductor adjacent to and in electrical contact with the metal surface of said shield, and extending generally parallel to the axis of the line, said further conductor being disposed in said plane of the parallel conductors.

References Cited

UNITED STATES PATENTS

| 2,805,276 | 9/1957 | Weitzel | 174—113 |
| 3,013,109 | 12/1961 | Gorman et al. | 174—113 |
| 3,130,256 | 4/1964 | Mildner | 174—28 |
| 3,315,025 | 4/1967 | Tomlinson | 174—107 |

FOREIGN PATENTS

| 748,468 | 11/1944 | Germany. |

OTHER REFERENCES

DuPont Plastics Bulletin No. 44, vol. 11, 1949.
Electronic World, vol. 72, No. 5, November 1964, pp. 36–38, 111, 112.

LEWIS H. MYERS, *Primary Examiner.*

A. T. GRIMLEY, *Assistant Examiner.*

U.S. Cl. X.R.

174—36, 110, 117